Nov. 18, 1958 — A. ROTH — 2,860,609
PISTON FOR MULTIPLE PISTON ENGINES
Filed Sept. 17, 1956 — 2 Sheets-Sheet 1

Inventor:
Adolf Roth

Inventor:
Adolf Roth

United States Patent Office 2,860,609
Patented Nov. 18, 1958

2,860,609

PISTON FOR MULTIPLE PISTON ENGINES

Adolf Roth, Essen, Germany

Application September 17, 1956, Serial No. 610,169

Claims priority, application Germany October 13, 1955

7 Claims. (Cl. 121—120)

The present invention relates to a double-acting piston for a multiple piston engine, i. e., a piston equipped with piston arm and rocking lever for engines with two pistons and three combustion chambers in each cylinder and with a crank shaft adjacent the cylinders as is, for example, disclosed in U. S. Patent No. 2,388,756.

Two double-acting pistons are displaced in each of the cylinders of such known engines, these pistons operating in opposite direction and each of the cylinders has three combustion chambers. In an engine of this kind, the power is transmitted from the piston to the crank shaft by means of a rocking lever passed through access slots in the side walls of the cylinder and piston into the interior of the. latter, where the rocking lever is pivotally connected to the piston by means of a short piston arm. Such design has the disadvantage that, with the piston closed at both ends, the access slot in the piston skirt has to be rather large to permit insertion of the piston arm to be connected to the piston. The strength of the highly stressed piston is considerably decreased by the large size of the access slot in the piston skirt. Side thrusts occurring in a piston of such construction are very dangerous. Such thrusts are obtained when the point, at which the piston arm is connected to the locking lever by means of a pin, moves along an arc, so that the piston arm swings about the piston pin, whereby the angle between the longitudinal axis of the piston arm and the piston axis is determined by the intantaneous position of the piston. If the amplitude of the piston arm and, thereby, the angle between the piston axis and the piston arm at the end positions of the latter would be decreased by lengthening the rocking lever, the size and weight of the engine with reference to its output would be increased. This, of course, is disadvantageous.

It is, therefore, an object of the present invention to overcome the aforementioned difficulties and to reduce the side thrusts acting on the piston while, at the same time, increasing its strength.

It is another object of the invention to provide in the interior of the piston an additional pin bearing firmly secured to the inner piston wall by means of ribs. This pin bearing has the same width as the rocking lever extending into the interior of the piston through the access slot in the side wall thereof. A piston arm comprising two parallel links spaced apart pivotally interconnects this additional pin bearing and the rocking lever with the aid of pins, whereby the latter lever and the additional pin bearing are disposed between these two parallel links of the piston arm.

As a result of this two-link design of the piston arm, each of the link parts is considerably narrower than a piston arm made of one piece. It is noted that, with this arrangement, a bifurcated member, heretofore necessary to connect one end of the piston arm to the rocking lever, can be omitted, the width of such bifurcated member determining the width of the access slot in the piston skirt. The decrease in the width of this slot, made possible by the provision of the piston arm formed by the two parallel and spaced links, results in a considerable increase in strength of the piston. A further advantage lies in that a larger space is available in the cylinder wall for scavenging or exhaust slots which should not be disposed in the zone where cutouts or access openings are provided in the piston skirt.

It is a further object of the present invention to offset the axis of the bearings of the piston pin for pivotally connecting the two links of the piston arm to the piston with respect to the center of the piston. This has the advantage that the piston arm swinging, as mentioned, about the piston pin during the piston strokes, is at least approximately parallel with respect to the cylinder axis when the highest pressure occurs in the cylinder. Therefore, the side thrust transmitted to the cylinder walls have rather small values.

The two links of the piston arm can be assembled in the interior of the piston by introducing them separately through the access slot in the piston skirt and then connecting them to the piston by means of a piston pin in a conventional manner. Thereafter, the piston arm links are connected to the rocking lever also by means of a pin. To introduce the latter pin in the piston, an opening is suitably provided in the piston skirt which can be closed after insertion of this pin.

It is a still further object of the invention to facilitate the assembling steps and to avoid the provision of the just mentioned opening in the piston skirt. According to this development of the invention, the piston is divided into two portions meeting in a radial plane at the access slot through which the rocking lever extends. While assembling, the one piston portion will be pivotally connected to the piston arm after the latter has been connected to the rocking lever. Thereafter, the two piston portions are joined in the cylinder. For joining the piston portions, one of them is suitably provided with a flange, the outer diameter of which is the same as the diameter of an annular, interior, seating surface or abutment at the end of the piston skirt of the other piston portion. The flange has a groove opposite a groove of the same width provided in the interior, annular surface of the skirt of the other piston portion. Due to this arrangement, the two piston portions can be joined by means of a resilient locking ring inserted in the grooves of the two piston portions.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Two embodiments of pistons according to the invention are illustrated in the attached drawing, in which.

Figure 1:
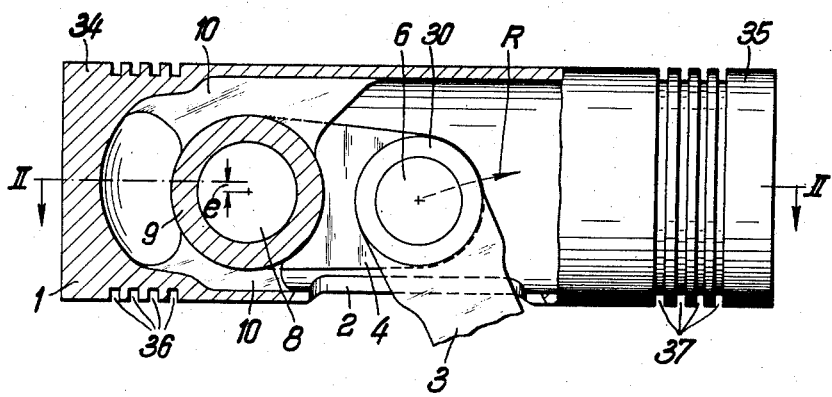
Figure 1 shows a longitudinal section through a piston according to a first embodiment of this invention.
Figure 2:
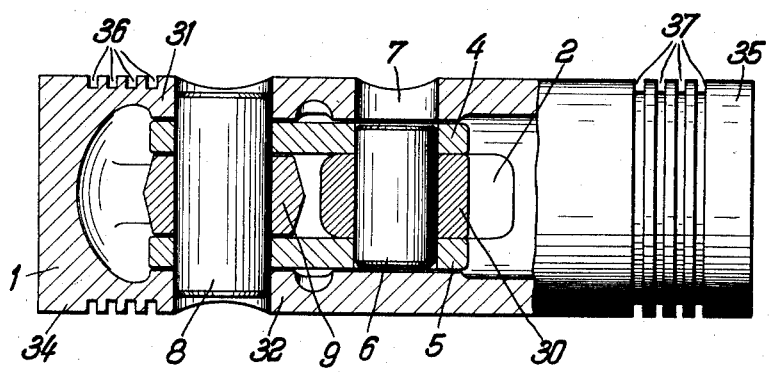
Figure 2 is another longitudinal section through the same piston along the line II—II of Figure 1 and looking in the direction of the arrows.

In a first embodiment of this invention, shown in Figures 1 and 2, a piston 1 with two head portions 34 and 35 has in its cylindrical wall or skirt a slot 2 through which a rocking lever 3 extends, the upper end of which being equipped with a pivot bearing 30. The construction of the central and lower portions of the rocking lever 3, broken off in Figure 1, may be conventional. The width of the slot 2 is slightly larger than that of the rocking lever 3. Links 4 and 5 of a two-part piston arm are respectively disposed at the two sides of the pivot bearing 30 of the rocking lever 3. These links 4 and 5 are pivotally attached at one of their ends to the rocking lever 3 by means of a pivot pin 6 which is introduced into the piston through an opening 7 in the cylindrical piston wall. If desired, this opening 7 may be closed after assembling by means of a suitable cover, not shown. The other ends of the two links 4 and 5 are pivotally connected to the piston 1 by means of a piston pin 8 seated in aligned pin bearings 31 and 32 provided in the piston skirt and in an additional or central bearing 9, which is also aligned with the pin bearings 31 and 32. The latter pin bearing 9 arranged between the two links 4 and 5 and having the same width as that of the pivot bearing 30 of the rocking lever 3, is integrally secured to the interior wall of the piston 1 by means of ribs 10.

As shown in Figure 1, the axis of the aligned pin bearings 9, 31 and 32 is offset a distance e, with respect to the axis of the piston 1. In the position of the rocking lever 3, illustrated in Figure 1, the piston 1 is close to the outer dead center. In this position, i. e., when the highest pressure occurs in the combustion chamber, the longitudinal axis of the two-part piston arm 4, 5 lies parallel with respect to the axis of the piston as a result of the offset position of the pin bearings 9, 31 and 32 and piston pin 8 with respect to the axis of the piston 1, so that only a small side thrust is transmitted by the piston 1. During the inward stroke of the piston, the center of the pin 6 moves along an arc indicated by the dotted line R, due to the displacement of the rocking lever 3, whereby the axis of the two-part piston arm 4, 5 assumes different angular positions with respect to the axis of the piston. The side thrusts occurring at such angular positions can be easily controlled, due to the reduced pressure in the combustion chamber present during this inward piston stroke. At the inner dead center of the piston, i. e., when a high pressure is present in the combustion chamber acting on the other head 35 of the piston 1, the axis of the piston arm 4, 5 is again parallel with respect to the axis of the piston 1, so that, in this piston position, the described advantages according to the invention with repect to elimination of side thrusts are also obtained.

The piston head portions 34 and 35 are provided with conventional grooves 36 and 37 for receiving piston rings, not shown.

Figure 3:
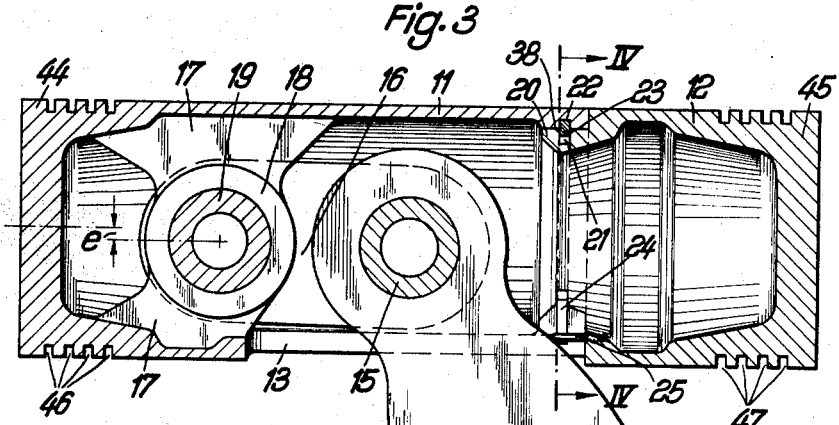
Figure 3 is a longitudinal section through a piston according to a second embodiment of the invention.
Figure 4:
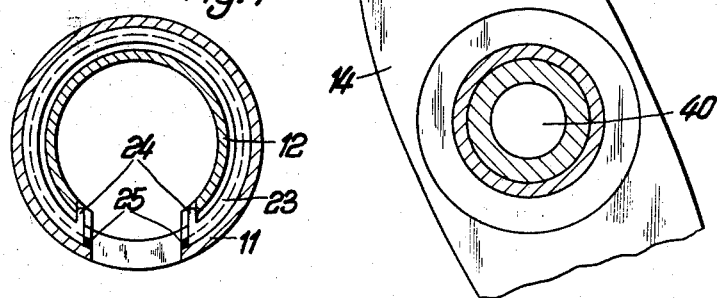
Figure 4 is a cross section through this piston along the line IV—IV of Figure 3, looking in the direction of the arrows.

In a second embodiment according to the invention, illustrated in Figures 3 and 4, a piston comprises two separate main portions 11 and 12, carrying head portions 44 and 45, respectively, with piston ring grooves 46 and 47, respectively. These main portions are joined at the end of an access slot 13 provided in the skirt of the piston portion 11. A rocking lever 14 extends through the access slot 13 into the interior of the piston portion 11 and is pivotally connected therein to links 16 of a two-part piston arm by means of a pin 15. An additional or central pin bearing 18 is provided in this piston portion 11 and is integrally secured thereto by means of ribs 17 in the same way as in the embodiment of Figures 1 and 2. The pin bearing 18 serves to pivotally connect the links 16 of the piston arm to the piston portion 11 by means of a pin 19 also seated with both ends in aligned pin bearings, such as pin bearings 31 and 32 in Figure 2 provided in the piston skirt. These pin bearings are offset a distance e, with regard to the axis of the piston. A flange 20 is provided on the end of the piston portion 12 facing the piston portion 11, the outer diameter of this flange 20 being the same as the inner diameter of an interior annular abutment surface 38 on the skirt of this piston portion 11. A groove 21 is provided in the flange 20, which groove is arranged opposite a groove 22 provided in the annular abutment 38 of the piston portion 11. After the portions 11 and 12 of the piston are joined, they are firmly held together by means of a resilient locking ring 23 inserted in the grooves 21 and 22. In order to prevent relative movements of the two piston portions 11 and 12, the locking ring 23 is locked to the piston portion 12 by means of two lugs 24, respectively provided at the ends of this ring 23 and to the piston portion 11 by means of two set screws 25.

Figure 5:
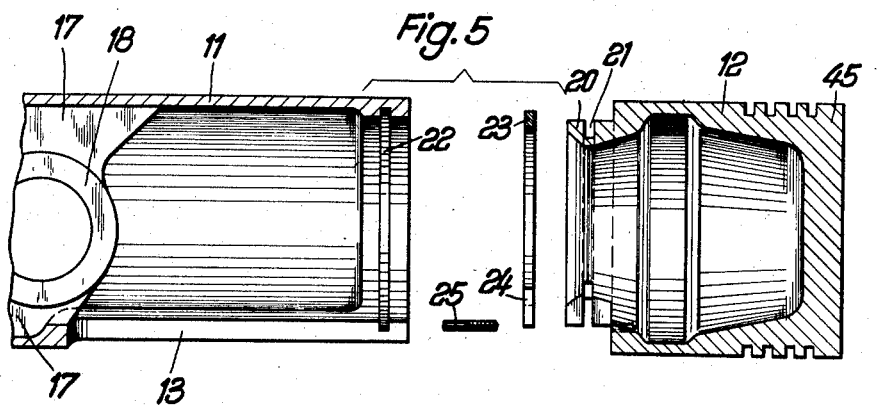
Figure 5 shows a cross-sectional view of the piston structure of Figures 3 and 4 prior to the assembly thereof.

Figure 5 shows the piston structure previously described in Figure 3, prior to assembly thereof, wherein elements 11 and 12 again denote the respective piston portions and locking ring 23, provided at its ends with lugs 24, is more clearly illustrated. Additionally, the set screws 25 are illustrated which are receivable in suitable borings provided in piston portion 12. The assembly of the piston structure is as follows: Initially, the locking ring 23 is carefully bent apart and is placed over flange 20 of piston portion 12 until it is seated within the groove 21. Thereafter, the ends of this locking ring 23 are drawn toward each other by means of lugs 24, so that its inner surface securely nests against and is contiguous with the peripheral wall of the groove 21, so that the outer diameter of the locking ring 23 substantially corresponds to the diameter of flange 20. Then, the piston portion 12 is displaced towards the open end of piston portion 11, as is best shown in Figure 5, whereby the flange 20 of the piston portion 12 and the outer surface of the locking ring 23 are received in the open end of the piston portion 11. As soon as groove 22 of the piston portion 11 is in alignment with groove 21 of the piston portion 12, the locking ring 23 springs open, thereby engaging both grooves 20 and 22, respectively. In this manner, a positive connection of the piston portions 11 and 12 with each other is attained through the intermediary of said locking ring 23. The end lugs 24 of this locking ring are readily accessible through the access slot 13 which is provided in the piston portion 11. In order to avoid relative rotation of the piston portions 11 and 12, the set screws 25 are inserted into their appropriate bores provided in piston portion 12; the latter assembling again being easily performed through the access slot 13. It will be readily apparent that the disassembly of the piston is accomplished by performing the aforementioned procedure by reversing the described assembling steps, so that initially the set screws 25, accessible by means of access slot 13, are removed from their respective borings, the lugs 24 being drawn together to an extent sufficient to free the locking ring 23 and the piston portion 12 from the interior of the piston portion 11.

The rocking lever 14 being a double-arm lever is pivoted at 40 intermediate its ends by means of a pin bearing mounted in the engine block, not shown. The lower end of the rocking lever 14, by means of which it is connected to the crank shaft via other members, is broken off in the illustration shown in Figure 4.

While specific embodiments of the invention have been shown and described in the foregoing, the invention is not limited to the exact details of construction set forth and embraces such changes, modifications and equivalents of the parts and their formation and arrangements as come within the purview of the appended claims.

I claim:

1. In an engine having a double-headed piston with a skirt portion between the piston heads and a rocking lever operatively connecting said piston and the crank shaft of said engine, the improvement consisting of an access slot in said skirt portion for said rocking lever through which one end of said rocking lever extends, bearing means inside said piston to which said end of said rocking lever is pivotally connected, the width of said access slot being slightly larger than the width of said rocking lever end, said bearing means comprising two aligned pin bearings, one in each side of said piston and an additional pin bearing substantially of the width of said rocking lever, said additional bearing being disposed between and aligned with said two side bearings, ribs integrally mounting said additional pin bearing in said piston with spaces left between said side pin bearings, a piston arm being formed by two parallel links being spaced apart and with one of their ends being respectively disposed in said spaces at the sides of said additional pin bearing, each of the ends of said links having openings, a pivot pin through said bearings and the openings in one of the ends of said links, the other ends of said links being respectively disposed on both sides of said pivot end of said rocking lever, and a pivot pin through the openings in said other link ends and said pivot end of said rocking lever.

2. In an engine having a double-headed piston with a skirt portion between the piston heads and a rocking lever operatively connecting said piston and the crank shaft of said engine, the improvement consisting of an access slot in said skirt portion for said rocking lever through which one end of said rocking lever extends, bearing means inside said piston to which said end of said rocking lever is pivotally connected, the width of said access slot being slightly larger than the width of said rocking lever end, said bearing means comprising a pin bearing located substantially in the center of said piston and being of the width of said rocking lever, ribs integrally mounting said pin bearing in said piston with spaces left between the inner side wall in said piston, a piston arm being formed by two parallel links being spaced apart and with one of their ends being respectively disposed in said spaces at the sides of said pin bearing, each of the ends of said links having openings, a pivot pin through said pin bearing and the openings in one of the ends of said links, the other ends of said links being respectively disposed on both sides of said pivot end of said rocking lever, and a pivot pin through the openings in said other link ends and said pivot end of said rocking lever.

3. In an engine according to claim 2, the axis of said pin bearing being slightly offset from the center of said piston, so that the longitudinal axis of said piston arm is substantially parallel with respect to the axis of said piston when the latter is at its dead centers.

4. In an engine according to claim 2, said piston being formed by two main portions, each portion carrying one of said head portions and having ends joined in a radial plane perpendicular with respect to the longitudinal axis of said piston, said radial plane intersecting said access slot, said pin bearing being integrally mounted by said ribs in one of said main portions.

5. In an engine according to claim 4, the end of one of said main piston portions having a flange comprising a retracted outer annular surface, the end of the other of said main piston portion having an internal annular abutment of the same diameter as said flange, said annular abutment seating firmly on said annular surface of said flange.

6. In an engine according to claim 5, a first groove in said outer annular surface, a second groove of the same width as said first groove in said internal annular abutment, said grooves being opposite one another, and a resilient locking ring inserted in said grooves to prevent said two main piston portions from separating.

7. In an engine according to claim 6, said resilient ring having an interruption of substantially the size of said access slot, lugs on the ends of said ring obtained by said interruption, said lugs forming abutments for the edges of said flange at said access slot, and set screws threaded into said other main piston portion at said access slot on both of said ends of said locking ring.

References Cited in the file of this patent
UNITED STATES PATENTS

| | | |
|---|---|---|
| 578,112 | Nash | Mar. 2, 1897 |
| 695,824 | Motsinger | Mar. 18, 1902 |
| 1,094,398 | Anderson | Apr. 21, 1914 |
| 1,819,702 | Drake | Aug. 18, 1931 |
| 1,910,315 | Bleser | May 23, 1933 |
| 2,079,156 | Danckwortt | May 4, 1937 |
| 2,388,756 | Meyers | Nov. 13, 1945 |
| 2,478,179 | Brockmeyer | Aug. 9, 1949 |

FOREIGN PATENTS

| | | |
|---|---|---|
| 619,964 | France | Jan. 11, 1927 |